(12) United States Patent
Li et al.

(10) Patent No.: US 10,375,408 B2
(45) Date of Patent: Aug. 6, 2019

(54) DEVICE CAPABILITY NEGOTIATION METHOD AND APPARATUS, AND COMPUTER STORAGE MEDIUM

(71) Applicant: ZTE CORPORATION, Shenzhen (CN)

(72) Inventors: Ming Li, Shenzhen (CN); Ping Wu, Shenzhen (CN); Guoqiang Shang, Shenzhen (CN); Yutang Xie, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 205 days.

(21) Appl. No.: 15/322,143

(22) PCT Filed: Nov. 19, 2014

(86) PCT No.: PCT/CN2014/091679
§ 371 (c)(1),
(2) Date: Mar. 24, 2017

(87) PCT Pub. No.: WO2015/196710
PCT Pub. Date: Dec. 30, 2015

(65) Prior Publication Data
US 2017/0223371 A1    Aug. 3, 2017

(30) Foreign Application Priority Data
Jun. 25, 2014 (CN) .......................... 2014 1 0291451

(51) Int. Cl.
*H04N 19/44* (2014.01)
*H04N 19/184* (2014.01)
(Continued)

(52) U.S. Cl.
CPC ............ *H04N 19/44* (2014.11); *H04L 69/24* (2013.01); *H04N 19/184* (2014.11);
(Continued)

(58) Field of Classification Search
None
See application file for complete search history.

(56) References Cited

U.S. PATENT DOCUMENTS 6,584,093 B1 * 6/2003 Salama ............... H04L 12/2856
                                                        370/351
8,953,671 B2    2/2015 Liao et al.
(Continued)

FOREIGN PATENT DOCUMENTS

CN    102123299    7/2011
CN    102223201    10/2011
(Continued)

OTHER PUBLICATIONS

Extend European Search Report for EP 14895886.1, completed by the European Patent Office on May 4, 2017 All together 8 Pages.
(Continued)

*Primary Examiner* — Mohammad J Rahman
(74) *Attorney, Agent, or Firm* — McDonald Hopkins LLC (57) ABSTRACT

A device capability negotiation method includes receiving, by a first device, a multilayer video data request sent by a second device, and sending, by the first device, response information to the second device. The response information includes at least one of the following information types: decoding capability information needed for decoding a multilayer video code stream, decoding capability information needed for decoding various layers in the multilayer video code stream, and decoding capability information needed for decoding different output layer combinations in the multilayer video code stream. Also disclosed are a device capability negotiation apparatus, and a computer storage medium.

14 Claims, 2 Drawing Sheets

(51) Int. Cl.
*H04N 19/597* (2014.01)
*H04N 19/70* (2014.01)
*H04N 19/423* (2014.01)
*H04N 21/2343* (2011.01)
*H04N 21/6332* (2011.01)
*H04N 21/6377* (2011.01)
*H04L 29/06* (2006.01)

(52) U.S. Cl.
CPC ......... *H04N 19/423* (2014.11); *H04N 19/597* (2014.11); *H04N 19/70* (2014.11); *H04N 21/234327* (2013.01); *H04N 21/6332* (2013.01); *H04N 21/6377* (2013.01)

(56) References Cited

U.S. PATENT DOCUMENTS

| | | | | |
|---|---|---|---|---|
| 9,473,771 | B2* | 10/2016 | Wang | H04N 19/597 |
| 9,641,852 | B2* | 5/2017 | Lu | H04N 19/30 |
| 2010/0202453 | A1 | 8/2010 | Martinez Bauza et al. | |
| 2012/0057635 | A1* | 3/2012 | Rusert | H04N 21/234309 375/240.16 |
| 2013/0016776 | A1* | 1/2013 | Boyce | H04N 19/30 375/240.06 |
| 2013/0022100 | A1* | 1/2013 | Liao | H04L 65/1069 375/240.01 |
| 2013/0070859 | A1* | 3/2013 | Lu | H04N 19/39 375/240.25 |
| 2013/0177071 | A1* | 7/2013 | Lu | H04N 19/30 375/240.03 |
| 2013/0251027 | A1* | 9/2013 | Lu | H04N 19/30 375/240.02 |
| 2014/0023138 | A1 | 1/2014 | Chen | |
| 2014/0086333 | A1* | 3/2014 | Wang | H04N 19/70 375/240.25 |
| 2014/0376617 | A1* | 12/2014 | Yang | H04N 19/147 375/240.03 |
| 2015/0189322 | A1* | 7/2015 | He | H04N 19/597 375/240.16 |
| 2016/0134868 | A1* | 5/2016 | He | H04N 19/112 |
| 2016/0173898 | A1* | 6/2016 | Samuelsson | H04N 19/105 375/240.25 |
| 2016/0330459 | A1* | 11/2016 | Choi | H04N 19/597 |

FOREIGN PATENT DOCUMENTS

| | | |
|---|---|---|
| CN | 104093028 | 10/2014 |
| WO | 2013009441 | 1/2013 |

OTHER PUBLICATIONS

Sullian et al., IEEE Transactions on Circuits and Systems for Video Technology Dec. 2012, vol. 22, 20 Pages, "Overview of the High Efficiency Video Coding (HEVC) Standard".

International Search Report for PCT/CN2014/091679, English Translation attached to original, Both completed by the Chinese Patent Office on Mar. 12, 2015, All together 6 Pages.

* cited by examiner

DEVICE CAPABILITY NEGOTIATION METHOD AND APPARATUS, AND COMPUTER STORAGE MEDIUM

CROSS-REFERENCE TO RELATED APPLICATION

This application is the U.S. national phase of PCT Application No. PCT/CN2014/091679 filed Nov. 19, 2014, which claims priority to Chinese Application No. 201410291451.5 filed Jun. 25, 2014, the disclosures of which are incorporated in their entirety by reference herein.

TECHNICAL FIELD

The present disclosure relates to the technical field of video coding and decoding, and more particularly to a method and an apparatus for device capability negotiation, and a computer storage medium.

BACKGROUND

In the ongoing standardization tracks based on H.265/High Efficiency Video Coding (HEVC) while providing backward compatibility, i.e. HEVC multi-view video coding extension framework (MV-HEVC) for Three-Dimensional Video (3DV) coding and Scalable High-efficiency Video Coding (SHVC), a unified common high-level structural design is adopted. The unified structural design is based on a concept of "multi-layer video coding", which introduces a concept of "layer" to represent different views in MV-HEVC and different scalable layers in SHVC, and to indicate views and scalable layers by means of layer identifiers (LayerIds).

In a working draft of multi-layer video coding standard, resource requirements for decoding a bitstream are represented by using Profile, Tier and Level, namely (P, T, L). Meanwhile, in a session setup process, a decoder may express its own maximum decoding capability by using (P, T, L). When the maximum decoding capability of the decoder meets the resource requirements for decoding the bitstream, the decoder may correctly decode the bitstream. In a current working draft of multi-layer video coding standard, a (P, T, L) requirement corresponding to accumulated resources needed for decoding an entire multi-layer video coding bitstream is signalled, and (P, T, L) requirements corresponding to resources needed for decoding various layers are signalled. Herein, an identifier index value of (P, T, L) corresponding to an accumulated resource requirement may be identical to a (P, T, L) identifier index value of an H.265/HEVC base layer (i.e., an H.265/HEVC Version 1 standard excluding standard extensions), but corresponding specific parameter values are different. For example, in the H.265/HEVC Version 1 standard, when a value of Level for a Main profile is 3.1, value of the parameter MaxLumaPs is 983040; and in SHVC standard extension, when a value of Level of the accumulated resource requirement for Scalable Main profile is 3.1, value of the parameter MaxLumaPs is 2*983040=1966080. The values of the corresponding parameters A parameter value corresponding to values of (P, T, L) representing resource requirements for decoding various layers are identical to those in the H.265/HEVC Version 1 standard.

In a technical proposal JCTVC-R0043 submitted to JCT-VC standard organization, the defects of signalling of a decoding capability in a bitstream using the foregoing method are pointed out. It is also suggested that besides the foregoing mentioned information, the corresponding requirements of decoding resources needed can be signalled respectively for different combinations of layers for output (i.e. Partition) probably used or needed for a multi-layer video coding bitstream. Thus, two different decoders (a multi-layer video coding decoder implemented by using conventional H.265/HEVC Version 1 decoders and a multi-layer video coding decoder implemented directly) may make a decision of whether the bitstream can be correctly decoded.

Although the existing method can sufficiently indicate a decoder capability needed for decoding the multi-layer video coding bitstream, in the initial period of communication session setup, a terminal decoder does not have any information about a multi-layer video coding bitstream to be received, and thus cannot provide the needed output layer information for a server to judge and select the bitstream to be sent. If the server sends detailed information of the bitstream to a terminal previously and the terminal performs selection, multiple rounds of negotiation are to be conducted in a session setup process, which leads to low efficiency and high delay. When network communication situation changes, for example, the network transmission rate changes from low to high, in order to fully utilize network resources to achieve optimal user experience, the server needs to re-send the detailed information of the bitstream, and the terminal selects an optimal combination of layers under the current condition and feeds back to the server for requesting the bitstream. Thus, such multiple reciprocating session processes increase the network burdens and also occupy terminal processing resources.

SUMMARY

In order to solve the existing technical problem, embodiments of the present disclosure expect to provide a method and an apparatus for device capability negotiation, and a computer storage medium.

An embodiment of the present disclosure provides a method for device capability negotiation, including:

receiving, by a first device, a multi-layer video data request sent by a second device; and sending, by the first device, response information to the second device, herein the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the multi-layer video data request sent by the second device includes decoding capability information of the second device;

the decoding capability information of the second device includes: capability information possessed by the second device for decoding a multi-layer video bitstream, and/or capability information possessed by the second device for decoding a base layer video bitstream.

Herein, the response information is sent to the second device at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

Herein, the decoding capability information is a decoder processing capability index indicated by parameters of Profile, Tier and Level in a multi-layer video coding standard.

Herein, the decoder processing capability index includes: a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

An embodiment of the present disclosure also provides a method for device capability negotiation, the method including:

sending, by a second device, a multi-layer video data request to a first device, herein the request includes: capability information possessed by the second device for decoding a multi-layer video bitstream, and/or capability information possessed by the second device for decoding a base layer video bitstream; and receiving, by the second device, response information sent by the first device.

Herein, the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the response information is sent to the second device at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

An embodiment of the present disclosure also provides an apparatus for device capability negotiation, applied to a first device, including:

a request receiving unit, arranged to receive a multi-layer video data request sent by a second device; and a response sending unit, arranged to send response information to the second device, herein the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the multi-layer video data request sent by the second device includes decoding capability information of the second device; the decoding capability information of the second device includes: capability information possessed by the second device for decoding a multi-layer video bitstream, and/or capability information possessed by the second device for decoding a base layer video bitstream.

Herein, the response sending unit is arranged to send to the second device the response information at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

Herein, the decoding capability information is a decoder processing capability index indicated by parameters of Profile, Tier and Level in a multi-layer video coding standard.

Herein, the decoder processing capability index includes: a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

An embodiment of the present disclosure also provides an apparatus for device capability negotiation, applied to a second device, including:

a request sending unit, arranged to send a multi-layer video data request to a first device, herein the request includes: capability information possessed by the second device for decoding a multi-layer video bitstream, and/or capability information possessed by the second device for decoding a base layer video bitstream; and a response receiving unit, arranged to receive response information sent by the first device.

Herein, the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the response information is sent by the first device at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

An embodiment of the present disclosure also provides a computer storage medium, including a set of computer-executable instructions which are used to execute the method for device capability negotiation of the first device.

An embodiment of the present disclosure also provides a computer storage medium, including a set of computer-executable instructions which are used to execute the method for device capability negotiation of the second device.

According to the method and apparatus for device capability negotiation, and the computer storage medium provided by the embodiments of the present disclosure, when the second device sends the multi-layer video data request to the first device, the first device is informed of the decoding capability information of the second device; and when the first device sends a response to the second device, the second device is informed of the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream. The negotiation of device capability is completed in the foregoing modes, such that multiple reciprocating responses are not needed in a session setup process, thus improving the efficiency of capability negotiation, reducing the time delay, alleviating network burdens, and optimizing device processing resources.

SPECIFIC EMBODIMENTS

The technical solution of the present disclosure will be further elaborated below in conjunction with accompanying drawings and specific embodiments.

Embodiment One

Figure 1:
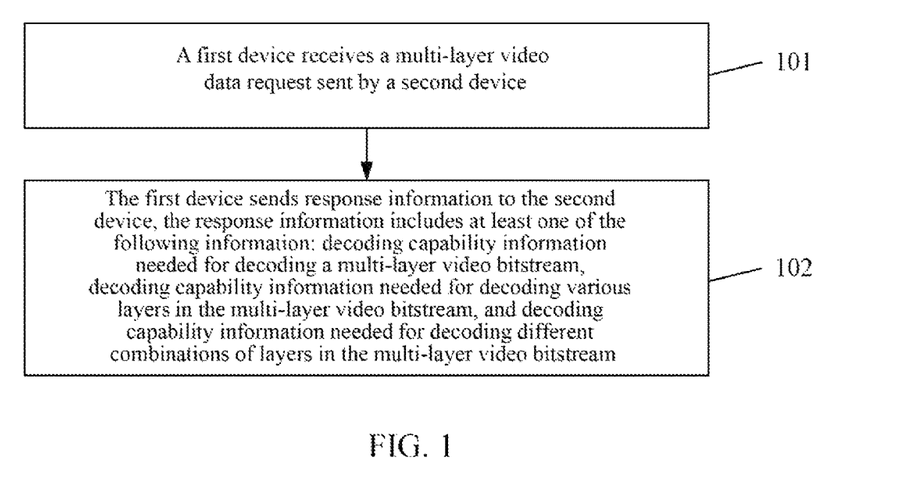
FIG. 1 is a flowchart of a method for device capability negotiation according to embodiment one of the present disclosure.

Embodiment one of the present disclosure provides a method for device capability negotiation, and as shown in FIG. 1, the method includes the following steps.

In step 101, a first device receives a multi-layer video data request sent by a second device.

Alternatively, the multi-layer video data request sent by the second device includes decoding capability information of the second device, the decoding capability information of the second device includes: capability information possessed by the second device for decoding a multi-layer video bitstream, and/or capability information possessed by the second device for decoding a base layer video bitstream. Herein, the base layer bitstream refers to a bitstream conforming to H.265/HEVC Version 1 standard.

In step 102, the first device sends response information to the second device, the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Alternatively, the response information is sent to the second device at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

That is to say, the first device may send the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream in the data load of the session negotiation protocol to the second device.

The first device may also send the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream in the Parameter Set unit of a multi-layer video coding standard to the second device.

The first device may also send the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream in the SEI unit of the multi-layer video coding standard to the second device.

The first device may also send the multi-layer video bitstream including the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream to the second device.

The first device may also send the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream in a corresponding system layer information unit, and/or user-defined data information unit and/or external information unit to the second device.

Certainly, the first device may also send the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream to the second device by means of any partition above.

Specifically, the decoding capability information may be a decoder processing capability index indicated by parameters of Profile, Tier and Level in a multi-layer video coding standard.

The decoder processing capability index includes, but is not limited to, a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

The above method for device capability negotiation of embodiment one is applied to the first device, and the first device may send a multi-layer video coding bitstream to the second device.

Embodiment Two

Figure 2:
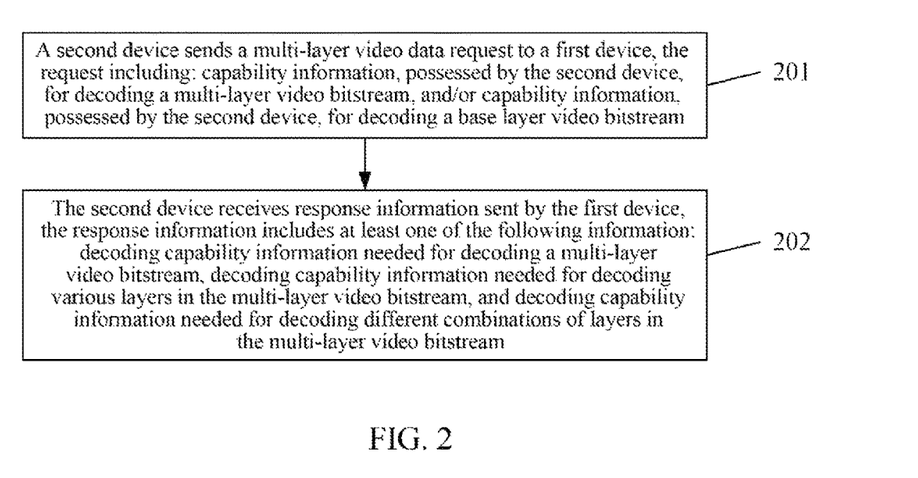
FIG. 2 is a flowchart of a method for device capability negotiation according to embodiment two of the present disclosure.

Embodiment two of the present disclosure provides a method for device capability negotiation, and as shown in FIG. 2, the method includes the following steps.

In step 201, a second device sends a multi-layer video data request to a first device, the request including: capability information possessed by the second device for decoding a multi-layer video bitstream, and/or capability information possessed by the second device for decoding a base layer video bitstream.

In step 202, the second device receives response information sent by the first device.

Specifically, the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Alternatively, the response information may be sent to the second device at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

The above method for device capability negotiation of embodiment two is applied to the second device, and the second device may receive a multi-layer video coding bitstream.

Embodiment Three

Figure 3:
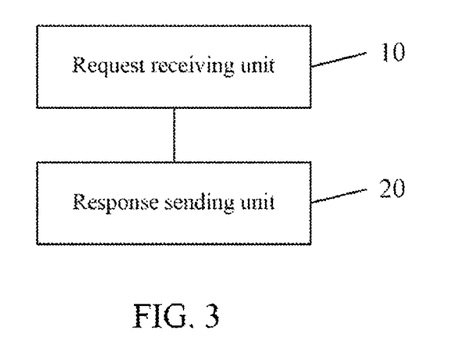
FIG. 3 is a structural diagram of an apparatus for device capability negotiation according to embodiment three of the present disclosure.

Corresponding to the method for device capability negotiation of embodiment one, embodiment three of the present disclosure provides a first device, and as shown in FIG. 3, the device includes:

a request receiving unit 10, arranged to receive a multi-layer video data request sent by a second device; and a response sending unit 20, arranged to send response information to the second device, herein the response information includes at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the multi-layer video data request sent by the second device includes decoding capability information of the second device; the decoding capability information of the second device includes: capability information possessed by the second device for decoding a multi-layer video bitstream, and/or capability information possessed by the second device for decoding a base layer video bitstream.

Herein, the response sending unit 20 is arranged to send to the second device the response information at one or more of the following positions:

data load(s) of a session negotiation protocol; Parameter Set(s); Supplemental Enhancement Information SEI; multi-layer video bitstream; system layer information unit(s); user-defined data information unit(s); and external information unit(s).

Herein, the decoding capability information is a decoder processing capability index indicated by parameters of Profile, Tier and Level in a multi-layer video coding standard.

The decoder processing capability index includes: a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

The embodiment of the present disclosure also provides a first device including the apparatus for device capability negotiation of the foregoing embodiment three, and the foregoing request receiving unit 10 and response sending unit 20 may be jointly implemented by a communication function chip of the first device in conjunction with a Central Processing Unit (CPU), a Micro Processing Unit (MPU), a Digital Signal Processor (DSP) or a Field-Programmable Gate Array (FPGA).

Embodiment Four

Figure 4:
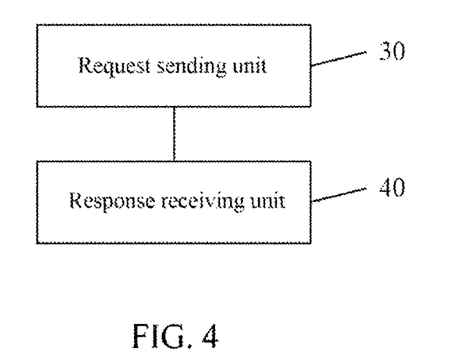
FIG. 4 is a structural diagram of an apparatus for device capability negotiation according to embodiment four of the present disclosure.

Corresponding to the method for device capability negotiation of embodiment two, embodiment four of the present disclosure provides a second device, and as shown in FIG. 4, the device includes:

a request sending unit 30, arranged to send a multi-layer video data request to a first device, herein the request includes: capability information possessed by the second device for decoding a multi-layer video bitstream, and/or capability information possessed by the second device for decoding a base layer video bitstream; and a response receiving unit 40, arranged to receive response information sent by the first device.

Herein, the response information may include at least one of the following information: decoding capability information needed for decoding a multi-layer video bitstream, decoding capability information needed for decoding various layers in the multi-layer video bitstream, and decoding capability information needed for decoding different combinations of layers in the multi-layer video bitstream.

Herein, the response information sent by the first device may be located on one or more of the following positions: data load(s) of a session negotiation protocol; Parameter Set(s); Supplemental Enhancement Information SEI; multi-layer video bitstream; system layer information unit(s); user-defined data information unit(s); and external information unit(s).

The embodiment of the present disclosure also provides a second device including the apparatus for device capability negotiation of the foregoing embodiment four, and the foregoing request sending unit 30 and response receiving unit 40 may be jointly implemented by a communication function chip of the second device in conjunction with a CPU, an MPU, a DSP or an FPGA.

It is needed to note that the method for device capability negotiation of the embodiment of the present disclosure is applicable between a terminal and a server, that is, the method for device capability negotiation of the embodiment of the present disclosure may refer to a method for capability negotiation between a terminal and a server in a process of requesting, by the terminal, the server for a multi-layer video bitstream; the first device being the server, and the second device being the terminal.

The method for device capability negotiation of the embodiment of the present disclosure is applicable between two terminals, that is, the method for device capability negotiation of the embodiment of the present disclosure may refer to a method for capability negotiation between two terminals in a process of requesting, by one of the terminals, the other terminal for a multi-layer video bitstream; the first device being one of the terminals, and the second device being the other terminal.

The second device in the embodiment of the present disclosure may request the first device for a multi-layer video coding bitstream and/or transport stream and/or media file by using a method for requesting, by the second device, for data in the foregoing embodiment. The second device in the embodiment of the present disclosure may be a bitstream receiving and playing device in video communication application, e.g. a mobile phone, a computer, a server, a set top box, a portable mobile terminal, a digital camera, and a television broadcast system device.

The first device in the embodiment of the present disclosure may send a response including the decoding capability information needed for decoding the multi-layer video bitstream, and/or the decoding capability information needed for decoding various layers in the multi-layer video bitstream, and/or the decoding capability information needed for decoding different combinations of layers in the multi-layer video bitstream to the second device by using a method for sending, by the first device, response information in the foregoing embodiment. The first device in the embodiment of the present disclosure may be a relevant bitstream generating and/or sending device in the video communication application, e.g. a mobile phone, a computer, a server, a set top box, a portable mobile terminal, a digital camera, and a television broadcast system device.

Embodiment Five

Embodiment five provides a method for capability negotiation with a server in a process of requesting, by a terminal, the server for a multi-layer video bitstream. The present embodiment is illustrated with an MV-HEVC bitstream, and processing an SHVC bitstream is similar.

There is an example MV-HEVC bitstream with 3 layers, namely L0, L1 and L2, on the server. The server may perform bitstream extraction and edition operations on the MV-HEVC bitstream as required to generate new bitstreams, and the decoding capability needed for decoding such new bitstreams corresponding to different combinations of layers is shown in Table 1:

TABLE 1

| Bitstream corresponding to combinations of layers for output | (Profile, Tier, Level) |
|---|---|
| Bitstream 1: output L0, L1 and L2 | (MV-HEVC Main, 0, 6.0) |
| Bitstream 2: output L0 | (HEVC Main, 0, 3.0) |
| Bitstream 3: output L1 | (HEVC Main, 0, 4.1) |
| Bitstream 4: output L2 | (HEVC Main, 0, 5.2) |
| Bitstream 5: output L1, L2 | (MV-HEVC Main, 0, 6.0) |

After receiving an operation instruction of a user, the terminal sends request information to the server for an MV-HEVC program bitstream, and in the request information, decoding capability information of a decoder used on the terminal is contained.

An MV-HEVC decoder on a terminal A is implemented by using two existing H.265/HEVC Version 1 decoders. The decoding capability of the decoder for decoding a bitstream (base layer bitstream) of an H.265/HEVC Version 1 and an MV-HEVC bitstream is shown in Table 2:

TABLE 2

| Decoder | (Profile, Tier, Level) |
|---|---|
| MV-HEVC decoder | (MV-HEVC Main, 0, 6.0) |
| H.265/HEVC Version 1 decoder 1 | (HEVC Main, 0, 6.0) |
| H.265/HEVC Version 1 decoder 2 | (HEVC Main, 0, 3.0) |

A data request sent by the terminal A to the server includes MV-HEVC bitstreams of two or more output layers. In the data request sent by the terminal A, the following decoder capability information is contained: MV-HEVC Decoder (MV-HEVC Main, 0, 6.0) and HEVC Version 1 Decoder (HEVC Main, 0, 6.0).

After receiving the data request of the terminal A, the server determines response information sent to the terminal A. Firstly, the server searches for combinations of layers for output suitable for the decoding capability of the terminal A in a list of combinations of layers for output as shown in Table 1 according to the decoder capability information provided by the terminal A in data request information. Because an MV-HEVC decoder of the terminal A has the decoding capability of (MV-HEVC Main, 0, 6.0) and meanwhile the H.265/HEVC Version 1 decoder of the terminal A has the decoding capability of (HEVC Main, 0, 6.0), the server selects to send a bitstream 1 containing three layers for output, i.e. L0, L1 and L2, to the terminal A.

The server sends response information to the terminal A, and in the response information, the server signals the combination of layers for output of the Bitstream 1 as shown in Table 1 and decoding capability information needed for this combination back to the terminal A. Alternatively, in the response information, the server may also provide decoding capability information needed for separately decoding Bitstream 2, Bitstream 3 and Bitstream 4 for outputting L0, L1 and L2 in Table 1 to the terminal A for reference. Alternatively, the server may also provide decoding capability information needed for decoding Bitstream 5 for outputting L1 and L2 in Table 1 in the response information. In this way, when judging that Bitstream 1 is not suitable for receiving and playing, the terminal A may directly request the server for sending Bitstream 5, thereby improving the efficiency of capability negotiation between the terminal A and the server.

The server may send the foregoing response information to the terminal A in multiple ways.

Herein, the server may send decoding capability information needed for a bitstream containing different combinations of layers for output by using a data load of a capability negotiation protocol.

The server may write the decoding capability information needed for the foregoing bitstream and relevant information of other video bitstreams into Video Parameter Set (VPS) of an MV-HEVC, and send the VPS to the terminal A.

The server may write the decoding capability information needed for the foregoing bitstream and the relevant information of the other video bitstreams into SEI of the MV-HEVC, and send the SEI to the terminal A.

The server may directly send an MV-HEVC video bitstream containing decoding capability information needed for Bitstream 1 to the terminal A. When determining that the Bitstream 1 is suitable for receiving, decoding and playing, the terminal A may directly receive and send the MV-HEVC Bitstream to the used decoder for decoding. If judging that the Bitstream 1 cannot be decoded, the terminal A may perform bitstream extraction operations on the bitstream, perform decoding and playing after obtaining Bitstream 5, and feed back to the server, the server stops sending Bitstream 1 to the terminal A and switches to Bitstream 5 for sending; under this circumstance, the terminal A may not perform receiving operations on Bitstream 1, but sends feedback information to the server to inform the server of changing into Bitstream 5.

The server may write the decoding capability information needed for the foregoing bitstream into a system layer information unit, and send the system layer information unit as the response information to the terminal A.

The server may write the decoding capability information needed for the foregoing bitstream into a user-defined data information unit (e.g., user-defined SEI information unit), and send the user-defined data information unit as the response information to the terminal A.

The server may write, by external means (e.g., dedicated feedback channel) in the capability negotiation process, the decoding capability information needed for the foregoing bitstream into an information unit used by the external means, and send the information unit as the response information to the terminal A.

Similar to the terminal A, an MV-HEVC decoder on a terminal B is implemented by using four existing H.265/HEVC Version 1 decoders. The decoding capability of the decoder for decoding an H.265/HEVC Version 1 bitstream (base layer bitstream) and an MV-HEVC bitstream is shown in Table 3:

TABLE 3

| Decoder | (Profile, Tier, Level) |
| --- | --- |
| MV-HEVC decoder | (MV-HEVC Main, 0, 4.0) |
| H.265/HEVC Version 1 decoder 1 | (HEVC Main, 0, 3.0) |
| H.265/HEVC Version 1 decoder 2 | (HEVC Main, 0, 3.0) |
| H.265/HEVC Version 1 decoder 3 | (HEVC Main, 0, 3.0) |
| H.265/HEVC Version 1 decoder 4 | (HEVC Main, 0, 3.0) |

A data request sent by the terminal B to the server includes MV-HEVC bitstreams of one or more output layers. In the data request sent by the terminal B, the following decoder decoding capability information is contained: MV-HEVC Decoder (MV-HEVC Main, 0, 4.0) and HEVC Version 1 Decoder (HEVC Main, 0, 3.0).

After receiving the data request of the terminal B, the server compares the decoder processing capability information of the terminal B with required decoding capability information corresponding to various combinations of layers for output in Table 1, to determine that the terminal B is only capable of decoding Bitstream 2. The server sends response information to the terminal B, and in the response information, the server feeds a combination of layers for output of Bitstream 2 in Table 1 and corresponding decoding capability information needed for Bitstream 2 back to the terminal B. Here, the method for sending, by the server, the response information to the terminal B is the same as the process of sending the response information to the terminal A, which will not be repeated.

Different from the terminal A and the terminal B, an MV-HEVC decoder in a terminal C is not formed by expanding the existing H.265/HEVC Version 1 decoder, but is directly designed and manufactured according to the MV-HEVC standard. The MV-HEVC decoder supports backward compatibility of H.265/HEVC Version 1 bitstreams. The decoding capability of the decoder for decoding H.265/HEVC Version 1 bitstream (base layer bitstream) and the MV-HEVC bitstream is shown in Table 4:

TABLE 4

| Decoder | (Profile, Tier, Level) |
| --- | --- |
| MV-HEVC decoder | (MV-HEVC Main, 0, 6.0) |
| H.265/HEVC Version 1 decoder | (HEVC Main, 0, 6.0) |

A data request sent by the terminal C to the server includes MV-HEVC bitstreams of at most two output layers. In the data request sent by the terminal C, the following decoder decoding capability information is contained: MV-HEVC Decoder (MV-HEVC Main, 0, 6.0) and HEVC Version 1 Decoder (HEVC Main, 0, 6.0).

After receiving the data request of the terminal C, the server compares the decoder processing capability of the terminal C with required decoding capability corresponding to various combinations of layers for output in Table 1, to determine that the terminal C can decode Bitstream 5. The server sends response information to the terminal C, and in the response information, the server feeds a combination of layers for output of Bitstream 5 in Table 1 and corresponding decoding capability information associated with Bitstream 5 back to the terminal C. Alternatively, in the response information sent by the server, decoding capability information needed for combinations of layers of Bitstream 3 and Bitstream 4 may also be contained for the terminal C to select. Here, the method for sending, by the server, the response information to the terminal C is the same as the foregoing process of sending the response information to the terminal A, which will not be repeated.

It is needed to note that the foregoing implementation method may also be applied to the occasion where the server actively pushes multi-layer video data to the terminal. The server firstly sends push information of the multi-layer video data to the terminal, and after the terminal determines to receive the video data pushed by the server, the terminal sends acknowledgment information of receiving the pushed data to the server by using the foregoing implementation method, namely, request information of requesting the server for the multi-layer video data. In the request information, decoding capability information of the terminal is contained. The server sends decoding capability information needed for decoding a multi-layer video bitstream to the terminal by using the foregoing implementation method according to the received terminal data request information and the contained decoding capability information.

Embodiment 6

The present embodiment provides a method for capability negotiation between two terminal devices in a process of requesting, by a terminal (terminal A), another terminal (terminal B) for a multi-layer video bitstream. The present embodiment is illustrated with an MV-HEVC bitstream, and processing of an SHVC bitstream is similar.

Application Scenario 1:

The terminal B stores or receives multi-layer video data, and the terminal A requests the terminal B for the multi-layer video data, e.g. a data sharing application. Implementation of this application may adopt the method of embodiment five. Specifically, the terminal A uses the terminal implementation method in embodiment five, and the terminal B uses the server implementation method in embodiment five.

Application Scenario 2:

The terminal B stores or receives multi-layer video data. Meanwhile, the terminal B pushes the multi-layer video data to other terminals (e.g., terminal A), e.g. a multi-screen sharing application. Implementation of this application may adopt the method of embodiment five. Specifically, after determining to receive the multi-layer video data pushed by the terminal B, the terminal A sends acknowledgement information of receiving the pushed data to the terminal B, namely, request information of requesting the terminal B for the multi-layer video data. In the request information, decoding capability information of the terminal A is contained. The terminal B sends decoding capability information needed for decoding a multi-layer video bitstream to the terminal A by using the server implementation method of embodiment five according to the received data request information of the terminal A and the contained decoding capability information.

Application Scenario 3:

The terminal B may use a camera to shoot and encode a shot video by using a multi-layer video coding standard. A communication link is established between the terminal A and the terminal B, and the terminal A requests the terminal B for multi-layer video data encoded in real time, e.g. real-time video sharing.

In multiview video data request information sent by the terminal A to the terminal B, the terminal decoding capability information in the terminal request information in embodiment five is contained.

Alternatively, an implementation method of the terminal B is that: the terminal B caches a multi-layer video coding bitstream generated by a coder thereof, and generates decoding capability information needed for decoding bitstreams corresponding to different combinations of layers for output as shown in Table 1 of embodiment five for the multi-layer video coding bitstream, and hereby sends the decoding capability information needed for decoding the multi-layer video bitstream to the terminal A using the implementation method of the server in embodiment five. The implementation method may be applied to a point-to-point communication mode between the terminal A and the terminal B, or may also be applied to a point-to-multipoint communication mode in which the terminal B receives multi-layer video data requests of a plurality of terminals simultaneously. In the point-to-multipoint communication mode, the terminal B sends the decoding capability information needed for decoding the multi-layer video bitstream respectively to a plurality of terminals requesting for multi-layer video data by using the server implementation mode of embodiment five.

Alternatively, another implementation mode of the terminal B is that: for decoding capability for the point-to-point communication mode between the terminal A and the terminal B, the terminal B saves information of a generated multi-layer video coding bitstream with different demands, as shown in Table 5:

TABLE 5

| Generable bitstream of terminal B | (Profile, Tier, Level) |
|---|---|
| Bitstream 1: containing three layers: L0, L1 and L2 | (MV-HEVC Main, 0, 6.0) |
| Bitstream 2: only containing layer L0 | (HEVC Main, 0, 3.0) |
| Bitstream 3: only containing layer L1 | (HEVC Main, 0, 4.1) |
| Bitstream 4: only containing layer L2 | (HEVC Main, 0, 5.2) |
| Bitstream 5: only containing layer L1 and L2 | (MV-HEVC Main, 0, 6.0) |

The terminal B generates a bitstream (e.g., the terminal A requests for a bitstream of "HEVC Main, 0, 4.0", and in this case, the terminal B generates Bitstream 2 of "HEVC Main, 0, 3.0" to ensure that the terminal A may perform correct decoding) according to the decoding capability information in the request information of the terminal A and the situation that a multi-layer video bitstream requiring different decoding capabilities can be generated in Table 5, and the terminal B uses the implementation mode of the server in embodiment five. The difference is that Table 5 is used to replace Table 1 in embodiment five, and the decoding capability information needed for decoding the multi-layer video bitstream is sent to the terminal A.

Alternatively, another implementation mode of the terminal B is that: for the point-to-multipoint communication mode between the terminal B and a plurality of terminals, the terminal B saves information of a generated multi-layer video coding bitstream with different demands for decoding capabilities, as shown in Table 5. The terminal B generates a bitstream (e.g., a bitstream of a minimum decoding capability request "HEVC Main, 0, 4.0", and in this case, the terminal B generates Bitstream 2 of "HEVC Main, 0, 3.0" to ensure that the plurality of terminals all may perform correct decoding) according to the lowest decoding capability in the request information of the plurality of terminals and the situation that a multi-layer video bitstream requiring different decoding capabilities can be generated in Table 5, and the terminal B uses the implementation mode of the server in embodiment five. The difference is that Table 5 is used to replace Table 1 in embodiment five, and the decoding capability information needed for decoding the multi-layer video bitstream is sent to all the plurality of terminals requesting for data.

Application Scenario 4:

The terminal A and the terminal B may use a camera to shoot and encode a shot video by using a multi-layer video coding standard. A communication link is established between the terminal A and the terminal B, and the terminal A requests the terminal B for multi-layer video data encoded in real time, e.g. a video telephone application.

Here, initiation of a video telephone from the terminal A to the terminal B is taken as an example for illustration.

The terminal A initiates a call request to the terminal B and requests for multi-layer video data of the terminal B. The terminal A performs implementation by using the implementation method of the terminal A in application scenario 3 of the present embodiment, and the terminal B performs implementation by using the implementation method of the terminal B in application scenario 3 of the present embodiment.

The terminal B accepts the call request of the terminal A, and sends call acknowledgment information to the terminal A, that is, the terminal B requests the terminal A for multi-layer video data. The terminal A performs implementation by using the implementation method of the terminal B in application scenario 3 of the present embodiment, and the terminal B performs implementation by using the implementation method of the terminal A in application scenario 3 of the present embodiment.

An embodiment of the present disclosure also provides a computer storage medium. The storage medium includes a set of computer-executable instructions, which are used to execute the method for device capability negotiation of the first device.

An embodiment of the present disclosure also provides a computer storage medium. The storage medium includes a set of computer-executable instructions, which are used to execute the method for device capability negotiation of the second device.

Those skilled in the art shall understand that the embodiments of the present disclosure may be provided as a method, a system or a computer program product. Thus, the present disclosure may be in a form of hardware embodiments, software embodiments or a combination of software and hardware embodiments. Moreover, the present disclosure may also be in a form of a computer program product implemented on one or more computer available storage media (including, but not limited to, a disk memory and an optical memory) containing computer available program codes.

The present disclosure is described with reference to flow charts and/or block diagrams of the method, the device (system) and the computer program product according to the embodiments of the present disclosure. It should be appreciated that each flow and/or block in the flow charts and/or the block diagrams and a combination of flows and/or blocks in the flow charts and/or the block diagrams may be implemented by computer program instructions. These computer program instructions may be provided to a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of other programmable data processing devices.

These computer program instructions may also be stored in a computer readable memory capable of guiding computers or other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to computers or other programmable data processing devices, such that a series of operation steps are executed on computers or other programmable devices to generate processing implemented by the computers, and therefore the instructions executed on the computers or the other programmable devices provide a step of implementing the functions designated in one or more flows of the flow charts and/or one or more blocks of the block diagrams.

The above is only the alternative embodiments of the present disclosure and is not used to limit the scope of protection of the present disclosure.

What we claim is:

1. A method for device capability negotiation, comprising two steps of:
    receiving, by a first device, a multi-layer video data request sent by a second device, wherein the multi-layer video data request comprises decoding capability information of the second device, and the decoding capability information comprises capability information possessed by the second device for decoding a multi-layer video bitstream, and/or capability information possessed by the second device for decoding a base layer video bitstream; and
    sending, by the first device, response information to the second device according to the decoding capability information of the second device, wherein the response information comprises at least one of the following information: decoding capability information needed for decoding a multi-layer video bitstream, decoding capability information needed for decoding various layers in the multi-layer video bitstream, and decoding capability information needed for decoding different combinations of output layers in the multi-layer video bitstream, wherein the first device is a server and the second device is a terminal, or the first device is a terminal and the second device is another terminal.

2. The method for device capability negotiation according to claim 1, wherein the response information is sent to the second device at one or more of the following positions:
    a data load/data loads of a session negotiation protocol; a Parameter Set/Parameter Sets; Supplemental Enhancement Information SEI; multi-layer video bitstream; a system layer information unit/system layer information units; a user-defined data information unit/user-defined data information units; and an external information unit/external information units.

3. The method for device capability negotiation according to claim 1, wherein the decoding capability information is a decoder processing capability index indicated by parameters of Profile, Tier and Level in a multi-layer video coding standard.

4. The method for device capability negotiation according to claim 3, wherein the decoder processing capability index comprises: a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

5. A method for device capability negotiation, comprising two steps of:
    sending, by a second device, a multi-layer video data request to a first device, wherein the multi-layer video data request comprises: capability information possessed by the second device for decoding a multi-layer video bitstream, and/or capability information possessed by the second device for decoding a base layer video bitstream; and
    receiving, by the second device, response information which is sent by the first device according to the capability information possessed by the second device, wherein the response information comprises at least one of the following information: decoding capability information needed for decoding a multi-layer video bitstream, decoding capability information needed for decoding various layers in the multi-layer video bitstream, and decoding capability information needed for decoding different combinations of output layers in the multi-layer video bitstream wherein the first device is a server and the second device is a terminal, or the first device is a terminal and the second device is another terminal.

6. The method for device capability negotiation according to claim 5, wherein the response information is sent to the second device at one or more of the following positions:
    a data load/data loads of a session negotiation protocol; a Parameter Set/Parameter Sets; Supplemental Enhancement Information SEI; multi-layer video bitstream; a system layer information unit/system layer information units; a user-defined data information unit/user-defined data information units; and an external information unit/external information units.

7. An apparatus for device capability negotiation, applied to a first device, comprising a processor and a memory, wherein the memory stores processor-executable programs that cause the processor to perform two steps of:
    receiving a multi-layer video data request sent by a second device, wherein the multi-layer video data request sent by the second device comprises decoding capability information of the second device, wherein the decoding capability information of the second device comprises: capability information possessed by the second device for decoding a multi-layer video bitstream, and/or capability information possessed by the second device for decoding a base layer video bitstream; and
    sending response information to the second device according to the decoding capability information of the second devices, wherein the response information comprises at least one of the following information: decoding capability information needed for decoding a multi-layer video bitstream, decoding capability information needed for decoding various layers in the multi-layer video bitstream, and decoding capability information needed for decoding different combinations of output layers in the multi-layer video bitstream wherein the first device is a server and the second device is a terminal, or the first device is a terminal and the second device is another terminal.

8. The apparatus for device capability negotiation according to claim 7, wherein the response sending unit is arranged to send to the second device the response information at one or more of the following positions:

a data load/data loads of a session negotiation protocol; a Parameter Set/Parameter Sets; Supplemental Enhancement Information SEI; multi-layer video bitstream; a system layer information unit/system layer information units; a user-defined data information unit/user-defined data information units; and an external information unit/external information units.

9. The apparatus for device capability negotiation according to claim 7, wherein the decoding capability information is a decoder processing capability index indicated by parameters of Profile, Tier and Level in a multi-layer video coding standard.

10. The apparatus for device capability negotiation according to claim 9, wherein the decoder processing capability index comprises: a maximum number of luma samples in a picture, a maximum size of a Coded Picture Buffer CPB, a maximum number of slice segments per picture, a maximum number of tile rows per picture, a maximum number of tile columns per picture, a maximum number of luma sample rate, a maximum bit rate, and a maximum compression ratio.

11. An apparatus for device capability negotiation, applied to a second device, comprising a processor and a memory, wherein the memory stores processor-executable programs that cause the processor to perform two steps of:

sending a multi-layer video data request to a first device, wherein the multi-layer video data request comprises: capability information possessed by the second device for decoding a multi-layer video bitstream, and/or capability information possessed by the second device for decoding a base layer video bitstream; and receiving response information, which is sent by the first device according to the capability information possessed by the second device, wherein the response information comprises at least one of the following information: decoding capability information needed for decoding a multi-layer video bitstream, decoding capability information needed for decoding various layers in the multi-layer video bitstream, and decoding capability information needed for decoding different combinations of output layers in the multi-layer video bitstream, wherein the first device is a server and the second device is a terminal, or the first device is a terminal and the second device is another terminal.

12. The apparatus for device capability negotiation according to claim 11, wherein the response information is sent by the first device at one or more of the following positions:

a data load/data loads of a session negotiation protocol; a Parameter Set/Parameter Sets; Supplemental Enhancement Information SEI; multi-layer video bitstream; a system layer information unit/system layer information units; a user-defined data information unit/user-defined data information units; and an external information unit/external information units.

13. A computer storage medium, comprising a set of computer-executable instructions which are used to execute the method for device capability negotiation according to claim 1.

14. A computer storage medium, comprising a set of computer-executable instructions which are used to execute the method for device capability negotiation according to claim 5.

* * * * *